US012722221B2

(12) United States Patent
Chadee

(10) Patent No.: US 12,722,221 B2
(45) Date of Patent: Sep. 1, 2026

(54) METHOD AND APPARATUS FOR IMPROVING THE QUALITY OF A BUTT WELD

(71) Applicant: Jason Chadee, Long Island City, NY (US)

(72) Inventor: Jason Chadee, Long Island City, NY (US)

(73) Assignee: UNICON LLC, Long Island City, NY (US)

( * ) Notice: Subject to any disclaimer, the term of this patent is extended or adjusted under 35 U.S.C. 154(b) by 181 days.

(21) Appl. No.: 17/206,826

(22) Filed: Mar. 19, 2021

(65) Prior Publication Data

US 2022/0297222 A1 Sep. 22, 2022

(51) Int. Cl.

*B23K 9/32* (2006.01)
*B23K 9/025* (2006.01)
*B23K 9/23* (2006.01)

(52) U.S. Cl.

CPC ................ *B23K 9/32* (2013.01); *B23K 9/025* (2013.01); *B23K 9/23* (2013.01)

(58) Field of Classification Search

CPC . B23K 9/32; B23K 9/025; B23K 9/23; B23K 9/0206; F02P 5/1506; Y02T 10/46

See application file for complete search history.

(56) References Cited

U.S. PATENT DOCUMENTS 2,362,505 A 11/1944 Smith
2,820,427 A 1/1958 Chyle et al.
3,372,852 A 3/1968 Cornell
3,494,020 A 2/1970 Cornell
3,972,466 A 8/1976 Keith
4,049,183 A 9/1977 Roden et al.
4,182,951 A * 1/1980 Kuder .................. B23K 9/0356 219/160
4,205,219 A 5/1980 Snell
4,344,556 A 8/1982 Knapp
4,759,981 A 7/1988 Weil
5,441,196 A 8/1995 Heinakari et al.
9,808,876 B2 11/2017 Xia et al.
2016/0167179 A1 6/2016 Wang et al.

(Continued)

FOREIGN PATENT DOCUMENTS

CN 111375873 A * 7/2020 ............... B23K 9/18
JP H10258361 A * 9/1998

(Continued)

OTHER PUBLICATIONS

Machine translation of KR-101492135: Jeong, Tap Piece for Arc Welding, 2013 (Year: 2013).*

(Continued)

*Primary Examiner* — Woody A Lee, Jr.
*Assistant Examiner* — Abigail H Rhue
(74) *Attorney, Agent, or Firm* — Adwar Ivko LLC; Jackie Schwartz

(57) ABSTRACT

Provided is a ceramic shelf assembly for aiding formation of a butt weld of adjacent metal plates in a groove formed between adjoining plates. The assembly has at least one ceramic block having at least one straight edge. The assembly further provides an apparatus for removably attaching the rear side of the ceramic block to a front surface of one of the adjacent metal plates along an edge of the groove.

10 Claims, 3 Drawing Sheets

(56) References Cited

U.S. PATENT DOCUMENTS

| | | | |
|---|---|---|---|
| 2016/0288234 A1 | 10/2016 | Adcock et al. | |
| 2020/0224065 A1* | 7/2020 | Hacikyan | C09J 9/00 |

FOREIGN PATENT DOCUMENTS

| | | | | |
|---|---|---|---|---|
| JP | 2019076930 A | * | 5/2019 | B23K 9/18 |
| KR | 20120019618 A | * | 8/2010 | |
| KR | 20130035705 A | * | 4/2013 | B23K 9/12 |
| KR | 101492135 B1 | * | 7/2013 | |

OTHER PUBLICATIONS

Machine translation of JP-2019076930: Baba, Arc welding processes, 2019 (Year: 2019).*

Machine translation of CN-111375873: Chen, Thin plate jointed board workstation and welding method, 2020 (Year: 2020).*

Machine translation of JP-H10258361: Sato, Horizontal position welding method, 1998 (Year: 1998).*

Machine translation of KR20120019618: Jeong, Tap piece for generating starting arc in arc welding, 2010 (Year: 2010).*

Machine translation of KR-20130035705: Lee, Circumference Welding Method, 2013 (Year: 2013).*

* cited by examiner 36
34c
34b
34a
38
1

METHOD AND APPARATUS FOR IMPROVING THE QUALITY OF A BUTT WELD

TECHNICAL FIELD

The present invention relates to joining of metal objects by thermal welding, including arc, heliarc, oxyacetylene, and the like; more particularly, to butt welding of metal plates; and most particularly, to a ceramic shelf assembly removably attachable to the front side of one of two adjacent weldable metal plates to prevent liquid weld material from overflowing a weld joint onto the front surface of one of the plates during formation of the weld joint.

BACKGROUND OF THE INVENTION

The present invention is directed to the art of thermal welding as by arc, heliarc, oxyacetylene, and the like.

In butt welding of adjacent plates or sheets of metal, and especially steel, one of the plates is provided with a square-cut end, referred to as a square edge, and the other plate is provided with a chamfered end, referred to as a bevel edge, thereby forming a V-shaped groove, also known as a single-bevel groove, for accumulation of molten welding material over the entire thickness of the plates. Each plate may be thought of as having a back side and a front side, and welding proceeds from the back corners or edges of the groove to the front corners or edges. The groove may be positioned on the underside of the plates ("overhead"); on the top side of the plates; in a vertical orientation on a wall; or in a horizontal orientation on a wall. In all such orientations except the last one, a welding joint may be finished by an expert welder with no welding material overflowing onto the face of either plate.

However, a problem arises in welding a horizontal groove between adjacent plates disposed vertically. In such a groove, the lower plate is provided with a square butt end, while the upper plate is chamfered or beveled as described hereinabove. As the groove filling nears completion, liquid weld material can easily and undesirably overflow the corner of the lower plate under gravity and solidify on the plate surface. Typically, such solidified material must be ground off in a further step which is wasteful of time, labor, and material.

In the prior art, there are numerous patents dealing with prevention of liquid material from flowing from the back side of a weld joint during the start of welding thereof. See, for example, U.S. Pat. No. 3,972,466 to Keith which discloses a welding back-up strip that incorporates woven carbon filter cloth and a pressure-sensitive adhesive layer attachable to the back sides of the adjacent plates. The cloth strip is adhered to the backs of adjacent work pieces across the back of the channel to be filled, and the work pieces then are butt welded. See also for example, U.S. Pat. No. 4,049,183 to Roden et al. which discloses a welding back-up tape utilizing a small diameter, heavy wall, flexible woven refracting filter tube within a slightly larger diameter tube. Both of the tubes are partially flattened against an adhesive coated surface of the wider heat resistant tape.

Several other patents also deal with preventing leakage of liquid weld material from the back side of the groove, but there is believed to be no prior art dealing with the front side problem described hereinabove.

What is needed in the art is a method and apparatus for reliably preventing such overflow from occurring on the front side of the weld, leaving a smooth transition between the weld reinforcement known as the cap or cover pass to the base metal joined, finished front side to the welded joint.

SUMMARY OF THE INVENTION

Provided is a ceramic shelf assembly for aiding formation of a butt weld of adjacent metal plates in a groove formed between adjoining plates. The assembly has at least one ceramic block having at least one straight edge. The assembly further provides an apparatus for removably attaching the rear side of the ceramic block to a front surface of one of the adjacent metal plates along an edge of the groove.

More precisely, the present invention is directed to a welding aid in the form of a ceramic shelf assembly attachable to the front side of one of two adjacent weldable metal plates, e.g., steel, aluminum, or other metals or alloys, to prevent liquid weld material from overflowing a weld joint during formation thereof. The present invention is especially useful when welding together two adjacent plates (upper and lower) oriented vertically with a horizontal weld therebetween.

A ceramic shelf assembly in accordance with the present invention comprises one or more heat resistant ceramic blocks disposed in a line along the weldable edge of the lower plate. Blocks in a line may be joined end-to-end by a strip of heat-resistant double-sided tape to secure the line of blocks together and to the surface of the square-butt plate, with the edges of the aligned blocks disposed at the very corner of the lower plate. Preferably, when a plurality of blocks are needed, the blocks may be further connected together on their upper surfaces with a second heat-resistant tape that is wide enough to also removably attach the blocks to the metal lower plate.

Alternatively, when welding ferromagnetic materials one or both of the tapes may be omitted, and the block or blocks may be fitted with magnets disposed in recesses in the blocks for removably attaching the blocks to the lower plate.

BRIEF DESCRIPTION OF THE DRAWINGS

The present invention will now be described, by way of example, with reference to the accompanying drawings, in which.

DETAILED DESCRIPTION OF THE INVENTION

Throughout the following description, specific elements are set forth in order to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Figure 1:
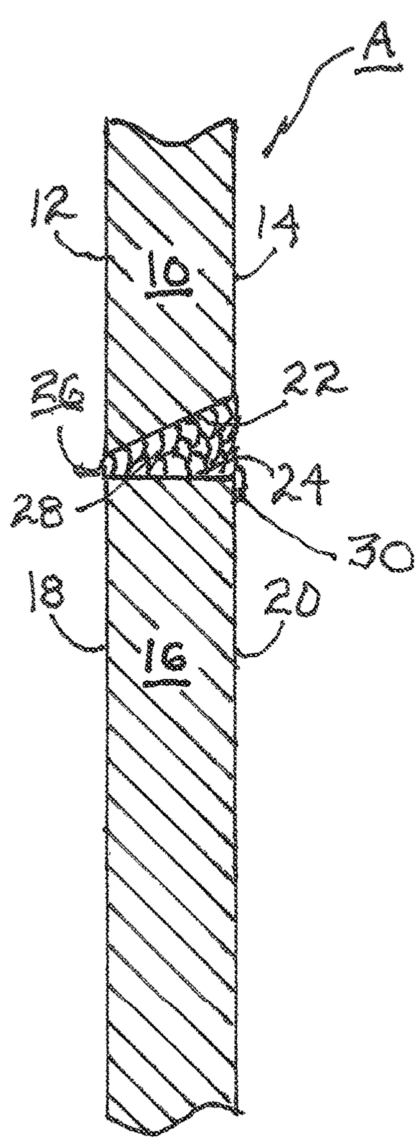
FIG. 1 is an elevational cross-sectional view from the side of a welded joint between two vertically oriented metal plates in accordance with the prior art.
Figure 1:
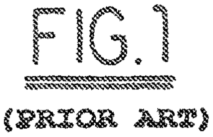

Referring now to FIG. 1, in a prior art welding assembly A, a first metal plate 10, having a back side 12 and a front side 14, and a second metal plate 16, having a back side 18 and a front side 20, are positioned vertically for being joined as by thermal welding as disclosed hereinabove. The metal may be, for example, steel, stainless steel, aluminum, titanium, metal alloys, or the like. First plate 10 has a face 22 chamfered or beveled at an angle from the horizontal of, for example, 45 degrees. Second plate 16 has a face 24 preferably orthogonal to back and front sides 18,20, creating an asymmetric V-shaped groove 26 between first and second plates 10,16 to be filled with molten welding material 28 in known fashion.

As shown in prior art FIG. 1, in forming a proper weld between faces 22 and 24, molten weld material may spill from groove 26 over the edge of face 24 under gravity and form an undesirable and unacceptable drip 30 on plate face 20 which then must be ground off.

It is the primary object of the present invention to prevent drip 30 from occurring.

Figure 2:
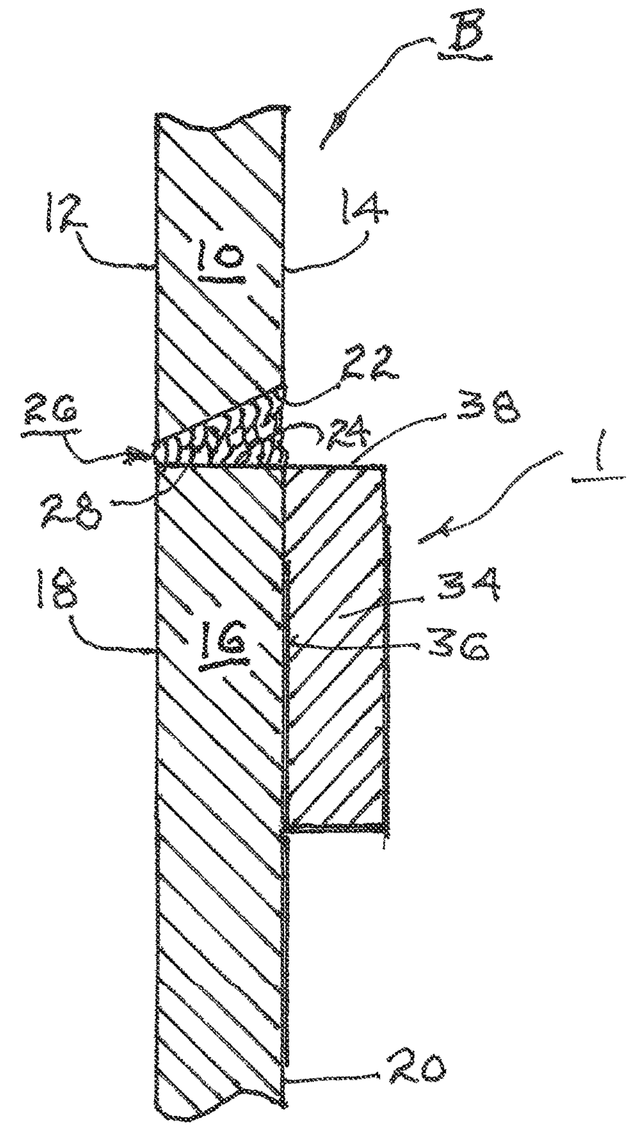
FIG. 2 is an elevational cross-sectional view from the side of a welded joint between two vertically oriented metal plates showing use of a ceramic shelf assembly in accordance with the present invention.
Figure 3:
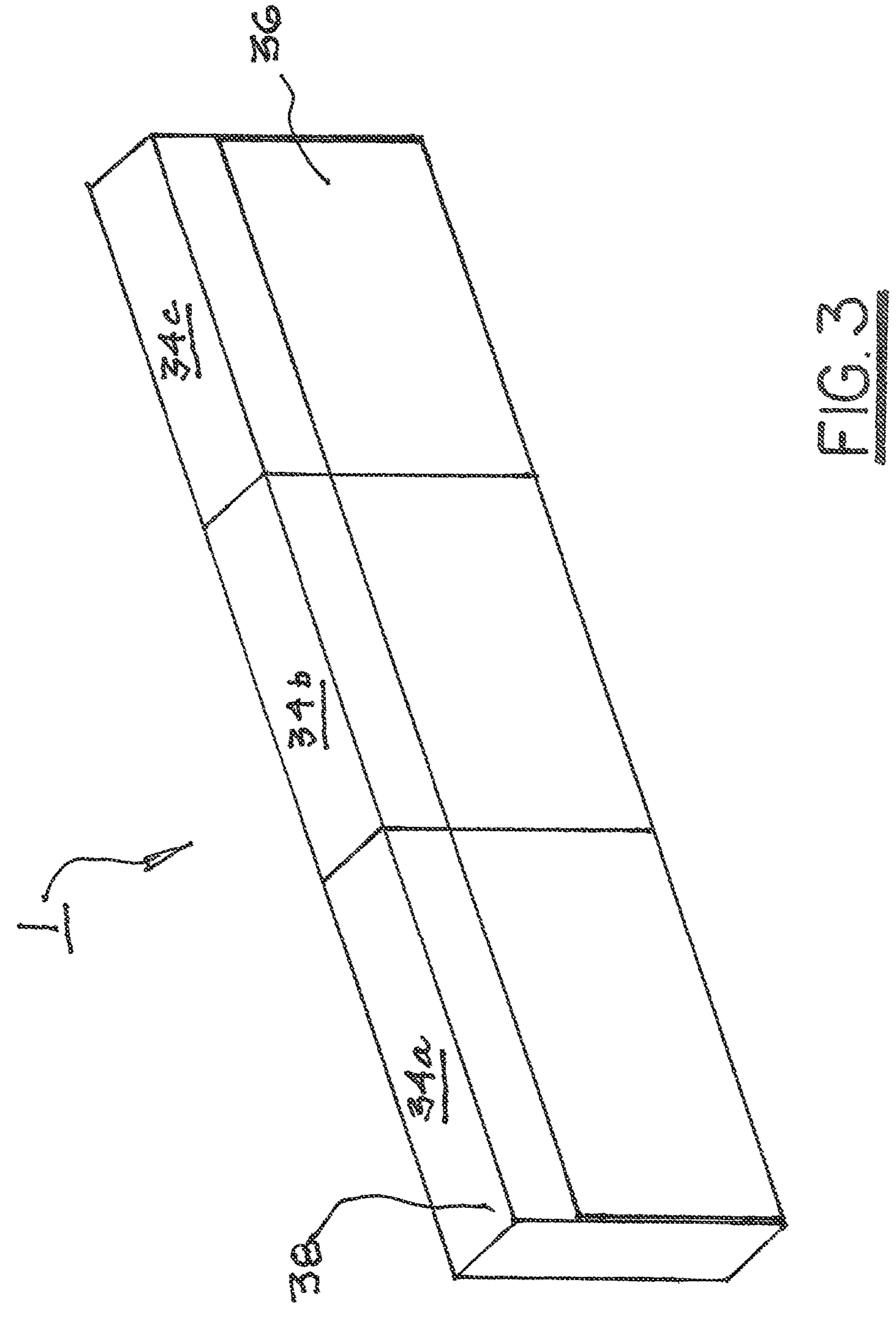
FIG. 3 is an isometric view from the rear of a first embodiment of a ceramic shelf assembly comprising a plurality of ceramic blocks having a heat resistant tape for attaching the assembly to a metal surface.

Referring to FIGS. 2 and 3, the arrangement and configuration B of first and second plates 10,16 is the same as shown in prior art FIG. 1. In addition, first embodiment 1 of a ceramic shelf assembly in accordance with the present invention is shown attached to plate face 20. Assembly 1 comprises a ceramic block 34, which may be one of a plurality of ceramic blocks 34*a*,34*b*,34*c* as shown in FIG. 3, and a first heat resistant tape 36 disposed between ceramic block 34 and plate face 20. Preferably but not necessarily, ceramic blocks 34*a*,34*b*,34*c* are rectilinear in shape. Face 38 forms a ceramic shelf coplanar with face 24. Shelf 38 acts to prevent formation of a drip 30 as shown in FIG. 1 when the novel ceramic shelf assembly is absent. When weld 28 is completed and the workpiece has cooled, ceramic block 34 and tape 36 may be removed, leaving a smooth transition between the weld and the base metal with no drip 30 at the corner of face 24.

Figure 4:
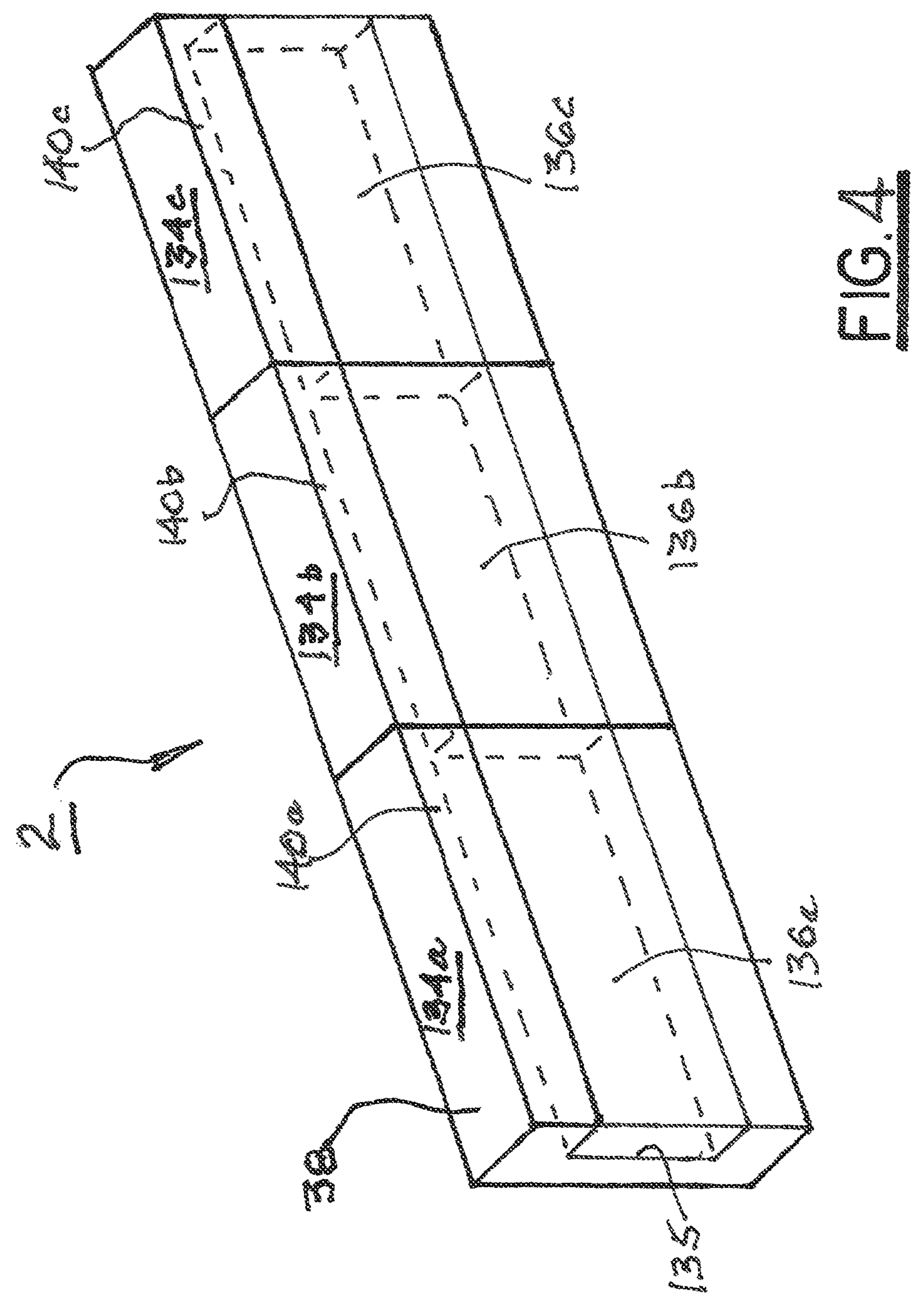
FIG. 4 is an isometric view from the rear of a second embodiment of a ceramic shelf assembly comprising a plurality of ceramic blocks having included magnets for attaching the assembly to a ferromagnetic surface.

Referring now to FIG. 4, a second embodiment 2 of a ceramic shelf assembly in accordance with the present invention is shown. Instead of tape 36 being used to attach the ceramic blocks to plate face 20 as in embodiment 1, heat resistant magnets 136*a*,136*b*,136*c* are disposed in recesses 135 of respective ceramic blocks 134*a*,134*b*,134*c* flush with back surfaces 140*a*,140*b*,140*c*.

While the invention has been described by reference to various specific embodiments, it should be understood that numerous changes may be made within the spirit and scope of the inventive concepts described. Accordingly, it is intended that the invention is not limited to the described embodiments but will have full scope defined by the language of the following claims.

What is claimed is:

1. A ceramic shelf assembly for aiding formation of a butt weld in a groove formed between vertically aligned first and second adjacent metal plates, the first adjacent metal plate including a chamfered angle and the second adjacent metal plate including a face extending orthogonal to front and back sides thereof to form the groove having an asymmetric V-shape, the ceramic shelf assembly comprising: a) a ceramic block having a straight edge and a top shelf; and b) a device, positioned between a rear side of said ceramic block and a front surface of said second adjacent metal plate, the device configured to releasably secure the rear side of said ceramic block to the front surface of said second adjacent metal plate adjacent an edge of said groove forming a coplanar surface between the top shelf and the orthogonal face of the second adjacent metal plate to prevent molten weld material from spilling over an edge of the face of the second adjacent metal plate.

2. The ceramic shelf assembly as recited in claim 1, wherein said ceramic block is rectilinear in shape.

3. The ceramic shelf assembly as recited in claim 1, wherein said device configured to releasably secure includes a double-sided heat-resistant tape positioned against said rear side of said ceramic block.

4. The ceramic shelf assembly as recited in claim 1, wherein said device configured to releasably secure includes at least one of a double-sided heat-resistant tape positioned against said rear side of said ceramic block and a single-sided heat-resistant tape disposed on said rear side of said ceramic block, said single-sided heat-resistant tape having a width large enough to secure said ceramic block to said front surface of said second adjacent metal plate.

5. The ceramic shelf assembly as recited in claim 1, wherein said device configured to releasably secure includes at least one magnet disposed in a recess in said ceramic block.

6. The ceramic shelf assembly as recited in claim 1, a plurality of ceramic blocks disposed end to end along the edge of said groove.

7. A method for preventing spillage of molten welding material from a welding groove formed between vertically aligned first and second metal plates onto a front surface of said first metal plate being butt-welded to said second metal plate, the first adjacent metal plate including a chamfered angle and the second adjacent metal plate including a face extending orthogonal to front and back sides thereof to form the groove having an asymmetric V-shape, comprising: a) releasably securing a back face of at least one ceramic block against said front surface of said second metal plate to form a coplanar surface with the orthogonal face of the second metal plate and prevent molten weld material from spilling over an edge of and onto a face of the second metal plate; b) filling said welding groove with molten welding material up to an edge of said at least one ceramic block; and c) removing said ceramic block from said front surface of said second metal plate.

8. The method as recited in claim 7 wherein releasably securing said back face of at least one ceramic block includes securing a back face of said at least one ceramic block to said front surface using a double-sided heat resistant tape.

9. The method as recited in claim 7 wherein releasably securing said back face of at least one ceramic block includes inserting a magnet within a recess in said at least one ceramic block, and positioning said back face of at least one ceramic block against said front surface of said second metal plate.

10. The method as recited in claim 7 wherein said filling said welding groove with molten welding material is preformed by one of arc, heliarc, and oxyacetylene.

* * * * *